United States Patent

Tyma

[19]

[11] Patent Number: 6,102,966
[45] Date of Patent: Aug. 15, 2000

[54] METHOD FOR RENAMING IDENTIFIERS OF A COMPUTER PROGRAM

[75] Inventor: Paul M. Tyma, Broadview Heights, Ohio

[73] Assignee: PreEmptive Solutions, Inc., Euclid, Ohio

[21] Appl. No.: 09/045,219

[22] Filed: Mar. 20, 1998

[51] Int. Cl.⁷ .................................................. G06F 9/45
[52] U.S. Cl. .......................................................... 717/1
[58] Field of Search .................................. 395/701, 705; 717/1

[56] References Cited

U.S. PATENT DOCUMENTS

| | | | |
|---|---|---|---|
| 5,367,685 | 11/1994 | Gosling ........................................ | 717/1 |
| 5,481,708 | 1/1996 | Kukol ........................................... | 717/1 |
| 5,499,333 | 3/1996 | Doudnikoff et al. ......................... | 717/1 |
| 5,535,391 | 7/1996 | Hejlsberg et al. ............................ | 717/1 |
| 5,579,520 | 11/1996 | Bennett ........................................ | 717/1 |

OTHER PUBLICATIONS

Kramer, D.; "The Java Platform, A White Paper". Accessed on Apr. 2, 1999. Retrieved from the Internet: http://www-.sun.com., May 1996.

Gosling et al.; "The Java Language Environment, A White Paper". Accessed on Apr. 2, 1999. Retrieved from the Internet: http://www.sun.com., May 1996.

Bacon et al.; "Compiler Transformations for High–Performance Computing". ACM Digital Library [online], ACM Computing Surveys, vol. 26, Iss. 4, pp 345–420, Dec. 1994.

Begole et al.; "Transparent Sharing of Java Applets: A Replicated Approach". ACM Digital Library [online], Tenth Annual Symposium on User Interface Software and Technology, pp. 55–64, Sep. 1997.

Aho et al.; Compilers–Principles, Techniques and Tools. Addison Wesley Publishing Company, Reading, MA, Chapter 2, Sep. 1985.

Lindholm et al.; The Java Virtual Machine Specification. Addison Wesley Publishing Company, Reading, MA, Chapters 1,2,4 and 6, Sep. 1996.

*Primary Examiner*—Eric W. Stamber
*Assistant Examiner*—Kelvin E. Booker
*Attorney, Agent, or Firm*—Blakely, Sokoloff, Taylor & Zafman

[57] ABSTRACT

A method for renaming identifiers in a Java™ program. In one embodiment, new names are assigned to Java classes, fields and methods within the given constraints inherent within a Java system. In one embodiment, a minimum number of different new names are assigned to the identifiers to achieve an optimal renaming. In one embodiment, a class inheritance hierarchy and method lists are used to identify naming dependencies. In one embodiment, new method names are then proposed and assigned systematically by starting at a given location in an ordered list of new names and then traversing the ordered list until an acceptable new name is identified in view of the naming dependencies. In one embodiment, naming redundancy is introduced. In one embodiment, the new names are shorter than the original names such that less storage space is required for the Java class files. In another embodiment, the new names are non-descriptive such that the program with renamed identifiers is obfuscated. In yet another embodiment, naming redundancies are removed such that an obfuscated program is easier to comprehend.

35 Claims, 11 Drawing Sheets

FIG. 6A

RoundedRectangle — 601A

| New Name | Original Name |
|---|---|
| | Draw() (from Shape) |
| | SetColor(Color) (from Shape) |
| | Draw() (from Rectangle) |
| | DrawCorner() (from Rectangle) |
| | Draw() (from RoundedRectangle) |

FilledRectangle — 603A

| New Name | Original Name |
|---|---|
| | Draw() (from Shape) |
| | SetColor(Color) (from Shape) |
| | Draw() (from Rectangle) |
| | Draw() (from FilledRectangle) |
| | Fill(int) (from FilledRectangle) |

Circle — 605A

| New Name | Original Name |
|---|---|
| | Draw() (from Shape) |
| | SetColor(Color) (from Shape) |
| | Draw() (from Drawable) |
| | Draw(int) (from Drawable) |
| | Draw() (from Circle) |
| | Draw(int) (from Circle) |

FIG. 6B

RoundedRectangle — 601B

| New Name | Original Name |
|---|---|
| | Draw() (from Shape) |
| | SetColor(Color) (from Shape) |
| | Draw() (from Rectangle) |
| | DrawCorner() (from Rectangle) |
| | Draw() (from RoundedRectangle) |

FilledRectangle — 603B

| New Name | Original Name |
|---|---|
| | Draw() (from Shape) |
| | SetColor(Color) (from Shape) |
| | Draw() (from Rectangle) |
| | Draw() (from FilledRectangle) |
| | Fill(int) (from FilledRectangle) |
| | DrawCorner() (from Rectangle) |

Circle — 605B

| New Name | Original Name |
|---|---|
| | Draw() (from Shape) |
| | SetColor(Color) (from Shape) |
| | Draw() (from Drawable) |
| | Draw(int) (from Drawable) |
| | Draw() (from Circle) |
| | Draw(int) (from Circle) |

| RoundedRectangle ~601C | | FilledRectangle ~603C | | Circle ~605C | |
|---|---|---|---|---|---|
| New Name | Original Name | New Name | Original Name | New Name | Original Name |
| a() | Draw() (from Shape) | a() | Draw() (from Shape) | a() | Draw() (from Shape) |
|  | SetColor(Color) (from Shape) |  | SetColor(Color) (from Shape) |  | SetColor(Color) (from Drawable) |
| a() | Draw() (from Rectangle) | a() | Draw() (from Rectangle) | a() | Draw(int) (from Drawable) |
|  | DrawCorner() (from Rectangle) | a() | Draw() (from FilledRectangle) | a() | Draw() (from Circle) |
| a() | Draw() (from RoundedRectangle) |  | Fill(int) (from FilledRectangle) |  | Draw(int) (from Circle) |
|  |  |  | DrawCorner() (from Rectangle) |  |  |

FIG. 6C

| RoundedRectangle | | FilledRectangle | | Circle | |
|---|---|---|---|---|---|
| New Name | Original Name | New Name | Original Name | New Name | Original Name |
| a() | Draw() (from Shape) | a() | Draw() (from Shape) | a() | Draw() (from Shape) |
| a(Color) | SetColor(Color) (from Shape) | a(Color) | SetColor(Color) (from Shape) | a(Color) | SetColor(Color) (from Shape) |
| a() | Draw() (from Rectangle) | a() | Draw() (from Rectangle) | a() | Draw() (from Drawable) |
| | DrawCorner() (from Rectangle) | a() | Draw() (from FilledRectangle) | | Draw(int) (from Drawable) |
| a() | Draw() (from RoundedRectangle) | | Fill(int) (from FilledRectangle) | | Draw() (from Circle) |
| | | | DrawCorner() (from Rectangle) | | Draw(int) (from Circle) |

FIG. 6D

| RoundedRectangle | | FilledRectangle | | Circle | |
|---|---|---|---|---|---|
| New Name | Original Name | New Name | Original Name | New Name | Original Name |
| a() | Draw() (from Shape) | a() | Draw() (from Shape) | a() | Draw() (from Shape) |
| a(Color) | SetColor(Color) (from Shape) | a(Color) | SetColor(Color) (from Shape) | a(Color) | SetColor(Color) (from Shape) |
| a() | Draw() (from Rectangle) | a() | Draw() (from Rectangle) | a(int) | Draw(int) (from Drawable) |
| | DrawCorner() (from Rectangle) | a() | Draw() (from FilledRectangle) | a() | Draw() (from Circle) |
| a() | Draw() (from RoundedRectangle) | | Fill(int) (from FilledRectangle) | a(int) | Draw(int) (from Circle) |
| | | | DrawCorner() (from Rectangle) | | |

FIG. 6E

601F RoundedRectangle

| New Name | Original Name |
|---|---|
| a() | Draw() (from Shape) |
| a(Color) | SetColor(Color) (from Shape) |
| a() | Draw() (from Rectangle) |
| b() | DrawCorner() (from Rectangle) |
| a() | Draw() (from RoundedRectangle) |

603F FilledRectangle

| New Name | Original Name |
|---|---|
| a() | Draw() (from Shape) |
| a(Color) | SetColor(Color) (from Shape) |
| a() | Draw() (from Rectangle) |
| a() | Draw() (from FilledRectangle) |
| b() | Fill(int) (from FilledRectangle) |
| b() | DrawCorner() (from Rectangle) |

605F Circle

| New Name | Original Name |
|---|---|
| a() | Draw() (from Shape) |
| a(Color) | SetColor(Color) (from Shape) |
| a() | Draw() (from Drawable) |
| a(int) | Draw(int) (from Drawable) |
| a() | Draw() (from Circle) |
| a(int) | Draw(int) (from Circle) |

FIG. 6F

601G RoundedRectangle

| New Name | Original Name |
|---|---|
| a() | Draw() (from Shape) |
| a(Color) | SetColor(Color) (from Shape) |
| a() | Draw() (from Rectangle) |
| b() | DrawCorner() (from Rectangle) |
| a() | Draw() (from RoundedRectangle) |

603G FilledRectangle

| New Name | Original Name |
|---|---|
| a() | Draw() (from Shape) |
| a(Color) | SetColor(Color) (from Shape) |
| a() | Draw() (from Rectangle) |
| a() | Draw() (from FilledRectangle) |
| b(int) | Fill(int) (from FilledRectangle) |
| b() | DrawCorner() (from Rectangle) |

605G Circle

| New Name | Original Name |
|---|---|
| a() | Draw() (from Shape) |
| a(Color) | SetColor(Color) (from Shape) |
| a() | Draw() (from Drawable) |
| a(int) | Draw(int) (from Drawable) |
| a() | Draw() (from Circle) |
| a(int) | Draw(int) (from Circle) |

FIG. 6G

METHOD FOR RENAMING IDENTIFIERS OF A COMPUTER PROGRAM

BACKGROUND OF THE INVENTION

1. Field of the Invention

The present invention relates to the field of computer science, and more particularly to a method and apparatus for renaming identifiers in Java™ class files.

2. Background Information

The Java language designed by Sun Microsystems, is a platform independent object-oriented programming language. It is analogous to C++ or Smalltalk in its high-level concepts. As with all programming languages, good design and solid program construction contributes to the maintainability and comprehensibility of program source code.

An important factor of "good design" is using meaningful names for identifiers. In Java, we can define an identifier as the name of any method, class or variable. A method is the name for a Java function or procedure. A method is largely identical to a function except that it has membership in some class, and therefore, a method has the same effective definition as a C++ "member function."

A class is a collection of related fields and methods. From classes we create objects. Therefore, a Java class is largely the same as a C++ or Smalltalk class.

Java variables are analogous to variables in any programming language, although Java classifies its variables into two high-level types: fields and local variables. A field is a variable that is global to a given class and represents the object-oriented concept of the "data" of a class. A local variable is local to a given method and only exists therein.

With the notable exception of local variables, all identifiers are stored after compilation within the Java object files known as "class" files because of their ".class" extension. Given that Java applications can use many of classes, methods and fields, the storage required for storing their names can be significant compared to the total size of the Java class files.

Keeping Java programs small is of increasing importance given that a common way of distributing of Java applications, sometimes referred to as "applets," is transmitting the applications across networks, such as for example the Internet. As network traffic continues to increase, it is desirable to reduce the size of Java applications to reduce the time and resources required for transmitting and storing the Java applications.

In addition, it would also be desirable for Java software developers to make it more difficult for others to reverse-engineer their Java applications. After spending large amounts of time and resources developing a software program, developers do not want to place their applications in the public domain in a form that gives away their efforts. However, the "good design" practice of using meaningful names for identifiers is Java applications has the consequence of rendering the Java applications more easily understandable and comprehensible to others.

SUMMARY OF THE INVENTION

A method for renaming identifiers in a Java™ program is described. In one embodiment, a class inheritance hierarchy of the computer program is generated. The class inheritance hierarchy identifies naming dependencies among methods of the computer program are identified. Method lists for each leaf class of the class inheritance hierarchy are generated. Each method list includes non-inherited methods of the leaf class and inherited methods of the leaf class. Default methods of parent classes having different package names are added to the method lists for each class. The original method names of the inherited methods of each method list are replaced consistently with corresponding different method names. The original method names of overridden methods of each method list are replaced consistently with corresponding different method names. The original method names of the remaining non-renamed methods of each class are replaced with corresponding different method names.

BRIEF DESCRIPTION OF THE DRAWINGS

The present invention is illustrated by way of example and not limitation in the accompanying figures.

FIG. 6A is an illustration of method lists of leaf classes of a class inheritance hierarchy in accordance with the teachings of the present invention.

FIG. 6B is an illustration of method lists of leaf classes of a class inheritance hierarchy with default methods added from parent classes having different package names in accordance with the teachings of the present invention.

FIG. 6C is an illustration of methods lists of leaf classes after one iteration of replacing original method names with corresponding names in accordance with the teachings of the present invention.

FIG. 6D is an illustration of methods lists of leaf classes after two iterations of replacing original method names with corresponding names in accordance with the teachings of the present invention.

FIG. 6E is an illustration of methods lists of leaf classes after three iterations of replacing original method names with corresponding names in accordance with the teachings of the present invention.

FIG. 6F is an illustration of methods lists of leaf classes after four iterations of replacing original method names with corresponding names in accordance with the teachings of the present invention.

FIG. 6G is an illustration of methods lists of leaf classes after five iterations of replacing original method names with corresponding names in accordance with the teachings of the present invention.

DETAILED DESCRIPTION

Figure 1:
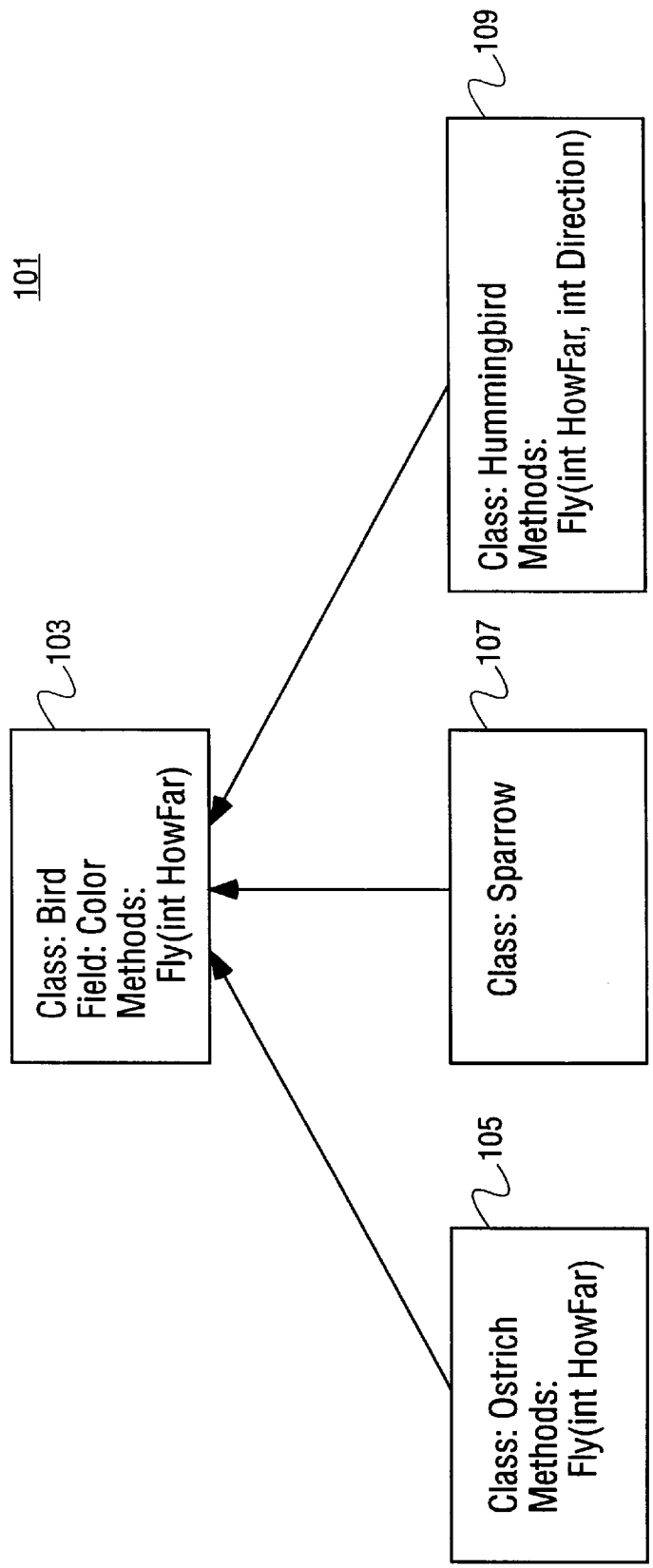
FIG. 1 is an illustration of one embodiment of a class inheritance hierarchy in accordance with the teachings of the present invention.

A method for renaming identifiers of a Java™ program is disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

As discussed, good programming practice generally involves the use of long, descriptive and meaningful identifier names. In Java, these names keep their original form throughout execution. Although these identifier names may be helpful during software design, development and maintenance, the long meaningful identifiers otherwise waste valuable storage and bandwidth as well as simplify reverse-engineering efforts.

In one embodiment, a technique for optimally renaming these identifiers to an optimal set of small names is described. For purposes of this disclosure, optimality is considered as the ability to rename many of the identifiers to the same string. In other words, one embodiment of the present invention introduces redundancy into the naming of identifiers. Such redundancy carries over in that Java class files may use one storage location to store the names of possibly many identifiers, thereby saving space and processing time. In addition such renaming impedes reverse-engineering efforts as the names are now meaningless. The original source code, however, remains intact with meaningful identifier names. In one embodiment, only the executable code contain the renamed identifiers.

In one embodiment, class file size reduction is realized by replacing identifier names with smaller names. Indeed, the small names often include only one character. This renaming or replacement process of the present invention does not affect the original source code, only the object code. Therefore, in one aspect of the present invention, "good programming practices" may be employed during the creation and maintenance the original source code such that descriptive and meaningful identifiable names are used. The resulting object code can have its identifiers renamed to save space in accordance with the teachings of the present invention. In addition, the renaming procedure of the present invention also impedes Java reverse-engineering efforts to the extent that code which is renamed is generally much more difficult to understand.

In one embodiment of the present invention, many of the identifiers are renamed with the same name, even though the original meaningful names may have been different. By having many same-named identifiers, storage of these names within Java class files allows the use redundant storage locations. For example, if one class, two methods and one field were all renamed to "a," there would only need to be one instance of the string "a" within the class file's constant pool. The constant pool is simply the storage area within Java class files for storing names, strings, and other information. The original names, such as for example, "BankAcct," "getBalance," "depositMoney," etc., each required their own many-character string. This redundancy aspect of the present invention results in further reduction of class file size.

Another benefit of the redundancy aspect of the present invention is that it also helps reduce the overall storage size of the Java program after the renaming procedure is complete. For example, if renaming began with "a" and the last name used when renaming was "z," another unique new name would have to be used, such as for example "aa." Indeed, "aa" is twice as long as "a," and therefore requires twice as much storage.

Methods in Java that are designed to have the same name are called "overloaded" methods. In one embodiment of the present invention, method overloading referred to as "overload induction" is utilized. By overloading methods with renamed small identifier names, the comprehensibility of decompiled code is further impeded. Thus, in one aspect of the present invention, the Java program is obfuscated by the presently described renaming procedure because many methods, which may have vastly different functions, might all be renamed redundantly to the same identifier "a."

It is appreciated that the presently described renaming technique described herein is not limited to renaming to simple English alphabetic letters. Instead, the present invention provides a general procedure, which in one embodiment optimally renames Java identifiers to a minimum set of new names. In one embodiment, the actual new names could be chosen by the implementor or user in accordance with the teachings of the present invention.

In another embodiment of the present invention, redundantly named identifiers can be renamed to uniquely named identifiers in accordance with the teachings of the present invention. Therefore, the obfuscated output of one embodiment of the present invention can be de-obfuscated with another embodiment of the present invention. As will be discussed, the redundantly named identifiers can be renamed to unique identifiers. By removing such redundancy, the Java code will be easier to understand and maintain.

In one embodiment, Java identifiers can generally be classified into three categories: classes, fields and methods. It is worthwhile to discuss the renaming of each category separately.

Identifying Characteristics For Class Names

In Java, class names have two possible parts, a package name and the actual class name. Although separate at compile time, the package name becomes part of the class name after compilation. The class name designates the simple idea of the class, such as for example "bird," "rectangle," etc. The package name is an organizational identifier which helps logically group related classes. For example, you may have:

XYZ.Graphics.Rectangle

XYZ.Graphics.Circle

In this example, the "XYZ" name may be a company name or some sort of ownership identifier. The "Graphics" name is still part of the package name further organizing the packages. Presumably, the XYZ Company could have many packages, such as for example utilities, tools, graphics, or the like.

Since package and class names are combined after compilation, they are treated as a single unit in one embodiment of the present invention. Therefore, all package organization aspects are disregarded. By treating the package and class names as a single unit, there are no duplicate or redundant class names after the renaming procedure of the present invention. In one embodiment, the original class names are replaced sequentially with new class names beginning with the letter "a." For example, the new class names would be "a," "b," "c," etc. It is appreciated that the use of "a," "b," "c," . . . , etc., are given for explanation purposes only. Other characters or strings such as for example but not limited to "1," "2," "3," . . . , etc., or "red," "orange," "yellow," . . . , etc. could also be used in accordance with the teachings of the present invention. In another embodiment, a user can add a prefix and/or a suffix to all class renames with the tradeoff being the addition of size for flexibility. Indeed, by adding a prefix and/or a suffix, some additional uniqueness may be added to the renamed classes.

Identifying Characteristics For Field Names

In Java, field names within a given class have no distinguishing characteristics besides the name itself. As will be discussed below with method names, field names are not affected by inheritance hierarchies. When considering all classes of a given application, field names can be distinguished by their name and class membership. For instance, a field "X" in a class "Rectangle" is different than a field "X" in class "Circle," even though both fields share then same name "X."

Given these parameters, we only need to distinguish field names within a given class. Thus, in one embodiment of the present invention, the renaming process is similar to the renaming process of class names discussed above. In one embodiment, the renaming of fields begins at a given or predetermined value, such as for example "a," and is sequentially incremented for each subsequent field in that class. For example, the original field name of one of the fields would be replaced with "a," another field name would be replaced with "b," and so on until all of the field names within each class are replaced.

In one embodiment, the renaming restarts with the given value, such as "a," for each class. Therefore in one embodiment, naming redundancy may be introduced because there is a possibility that every field name is renamed to "a" assuming that each field is included with a different class. In addition, it is noted that some classes of a Java program may not include any fields.

In another embodiment, the renaming does not restart at the given value for each class. Instead, non-redundant unique names are always proposed. As a result, redundantly named fields will be renamed uniquely. As mentioned earlier, a benefit of this embodiment would be to de-obfuscate the output of another embodiment of the present invention.

It is appreciated that in one embodiment of the present invention, local variable names are not renamed since they do not exist after compilation. In one embodiment, the presently described renaming procedure is only performed directly on class files or object files, which exist only after compilation.

Identifying Characteristics For Method Names

In Java, methods are unique in that the distinguishing characteristics work into how Java's object-oriented model works. Firstly, it can be said that the name itself is distinguishing. Secondly, the parameter list of a method uniquely identifies it.

calculateSine(float x)

calculateSine(int x)

In the eyes of the compiler and runtime, these two methods, whether they are in the same class or not, are very different. Although both methods share the same name, "calculateSine," each method can be distinguished by their respective parameter lists—"float x" and "int x."

The 'per class' uniqueness of fields is qualified when speaking about methods. Object-oriented programming in general and Java specifically support method inheritance. FIG. 1 is an illustration of one embodiment of a class inheritance hierarchy 101 that illustrates this idea. The "Bird" class 103 defines a generic bird. "Bird" class 103 includes a field "Color" and a method "Fly." Thus, by the design of "Bird" class 103, we are led to believe that all birds have a color and can fly. The "Sparrow" class 107 inherits from bird and therefore inherits the field "Color" and the method "Fly." Therefore, if you ask a "Sparrow" object to fly, it will call the "Fly" method within "Bird" class 103.

The "Hummingbird" class 109 gives another version of the method "Fly" since, for the sake of this example, it is presumably sometimes important to specify the direction of a hummingbird. Therefore, the "Hummingbird" class 109 has two "Fly" methods—the one it inherited from "Bird" class 103 and the one it defined, which is non-inherited. Java compilers decide which the programmer wants solely based on the parameter list they use for the call. The "Fly" method of "Bird" class 103 has the parameter list "int HowFar" while the parameter list of "Hummingbird" class 109 has the parameter list "int HowFar, int Direction."

The "Ostrich" class 105 also gives a version of the method "Fly." However, the "Fly" method of "Ostrich" class 105 overrides the "Fly" version in "Bird" class 103. Both "Fly" methods of "Bird" class 103 and "Ostrich" class 105 share the same parameter list "int HowFar." For the sake of this example, the "Bird" class 103 version of "Fly" presumably involves flight which is not appropriate for an ostrich.

Overridden methods are methods that appear in both the parent, or superclass, and subclass of an inheritance hierarchy. The method names and parameter lists must match exactly for it to be an override. The amount of flexibility in the Java language is significant and because of this, overridden method names must remain consistent or in sync. It is acceptable to rename sets of overridden and overriding methods, as long as the method names remain consistent or in sync for all the methods.

Figure 2:
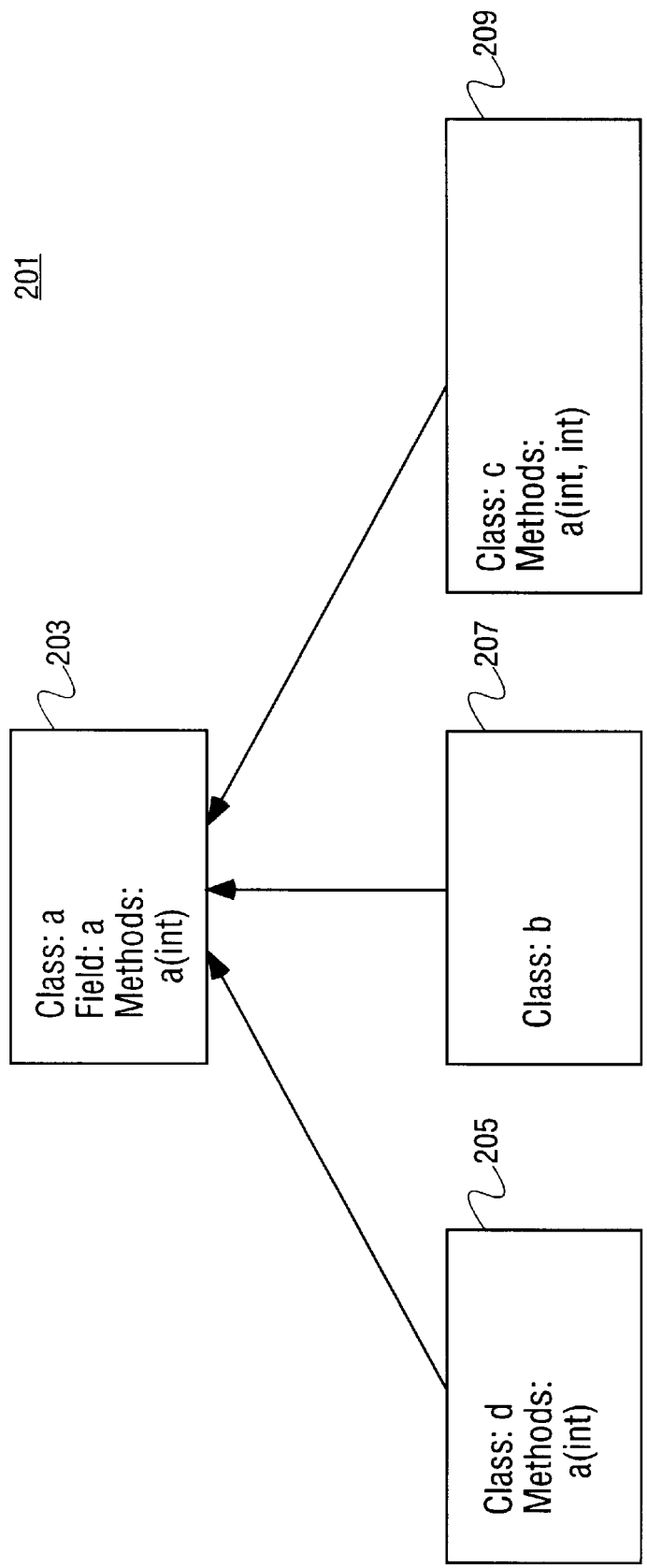
FIG. 2 is an illustration of one embodiment of a class inheritance hierarchy with renamed identifiers in accordance with the teachings of the present invention.

Method renaming is constrained by insuring that overridden methods, across many inheritance trees are renamed consistently. FIG. 2 is the class inheritance hierarchy of FIG. 1 with optimally renamed identifiers in accordance with the teachings of the present invention. As shown in FIG. 2, classes "Bird," "Ostrich," "Sparrow" and "Hummingbird" are renamed to classes "a," "d," "b" and "c" respectively. Field "Color" is renamed to "a." Methods "Fly" of "Bird" class 103 and "Ostrich" class 105 are renamed to "a(int)" of classes 203 and 205, and method "Fly" of "Hummingbird" class 109 is renamed to "a(int, int)" of class 209.

In another embodiment, it is noted that the "Fly" method of "Hummingbird" class 109 could have been renamed to "b(int, int)" instead of "a(int, int)." This renaming would also be acceptable. However, this renaming would not be optimal in accordance with the teachings of the present invention. Even though the methods started out all as "Fly," the "Hummingbird" class 109 version of "Fly" has a different parameter list, which is sometimes referred to as signature. Therefore, in the eyes of the compiler, the "Fly" method of "Hummingbird" class 109 was already a very different thing. Renaming the "Fly" method of "Hummingbird" class 109 to "b" is acceptable, even though it no longer shares the same rename as the other "Fly" methods. In addition, it is worthwhile to note that in other inheritance trees, many other completely unrelated methods could also be renamed to "a" as long as their parameter lists were different.

The "Fly" methods from "Bird" class 103 and "Ostrich" class 105 of FIG. 1, which are renamed to "a" and "d," respectively, in FIG. 2, must have the same name. Indeed, FIG. 2 shows both original "Fly" methods replaced with "a." Of course, names other than "a" would also have been acceptable so long as the "Fly" methods of "Bird" class 103 and "Ostrich" class 105 were renamed consistently.

Figure 3:
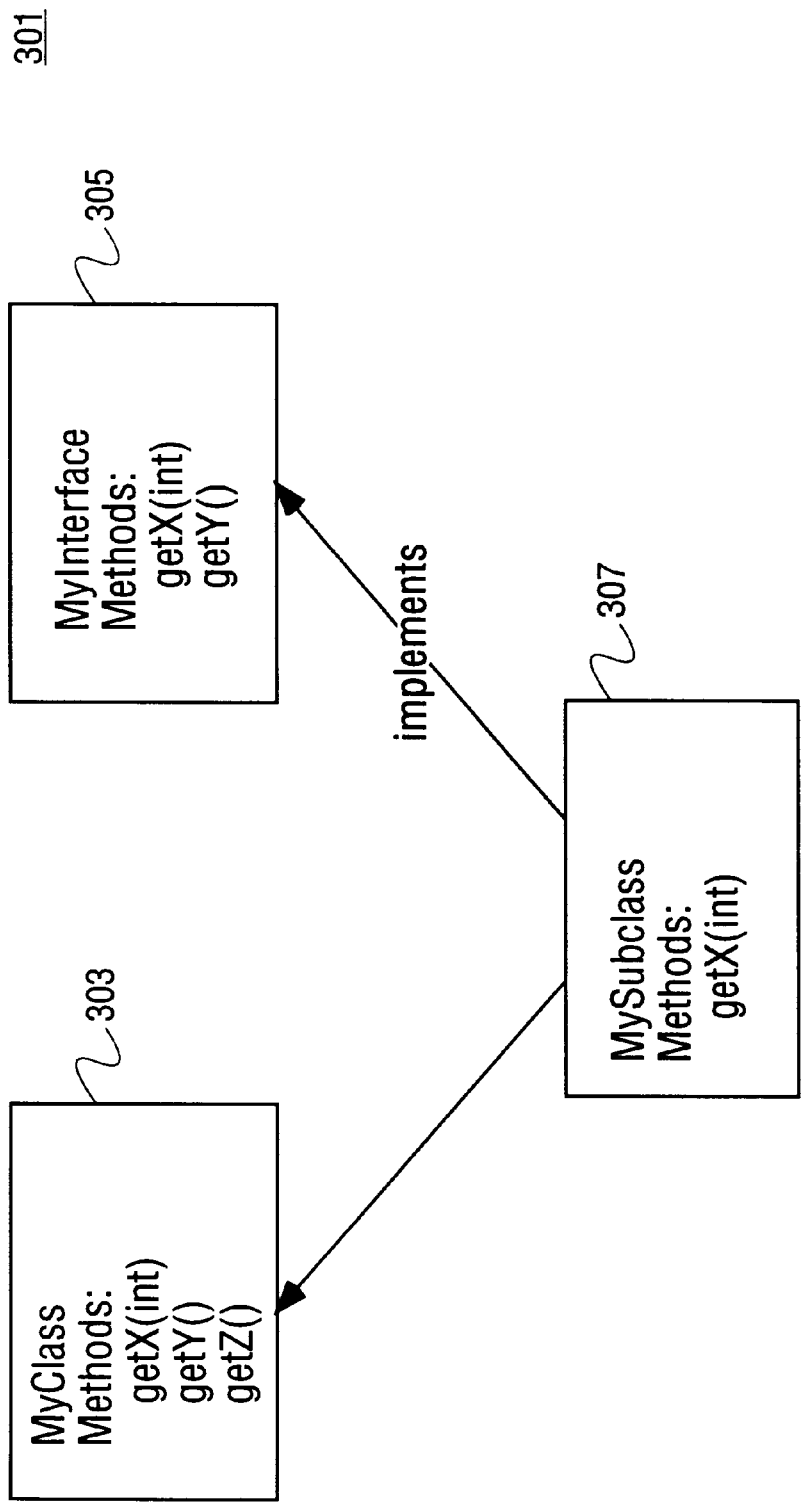
FIG. 3 is an illustration of one embodiment of a class inheritance hierarchy with an interface in accordance with the teachings of the present invention.

Java also has a construct called an "interface." Although an interface looks much like a class, it can have no actual program code. Interfaces are complex design tools. For purposes of the present invention, the renaming of Java interfaces are treated the same as Java classes. Interfaces can expand the possibilities of the class inheritance hierarchy tree as seen in FIG. 3. FIG. 3 is an illustration of a class inheritance hierarchy 301 including an interface, MyInterface 305. MyInterface 305 is implemented by MySubclass 307. MySubclass also inherits methods from MyClass 303. It is noted that any given class may have many interfaces but only one parent class or superclass.

Interfaces require any class that implements them override all of its methods. Therefore, all classes implementing MyInterface 305 must have a getX(int) and a getY( ) method. The MySubdlass class 307 does this as it includes getX(int) and inherits getY( ). As before, all overrides must be renamed alike in one embodiment of the present invention. Therefore, all getX(int) methods must be renamed to the same string. The same is true for all getY( ) methods.

It is noted that getY( ) and getZ( ) of MyClass 303 have the same parameter list. Therefore, getY( ) and getZ( ) are not renamed to the same string or there would be no way to distinguish the two methods.

Figure 4:
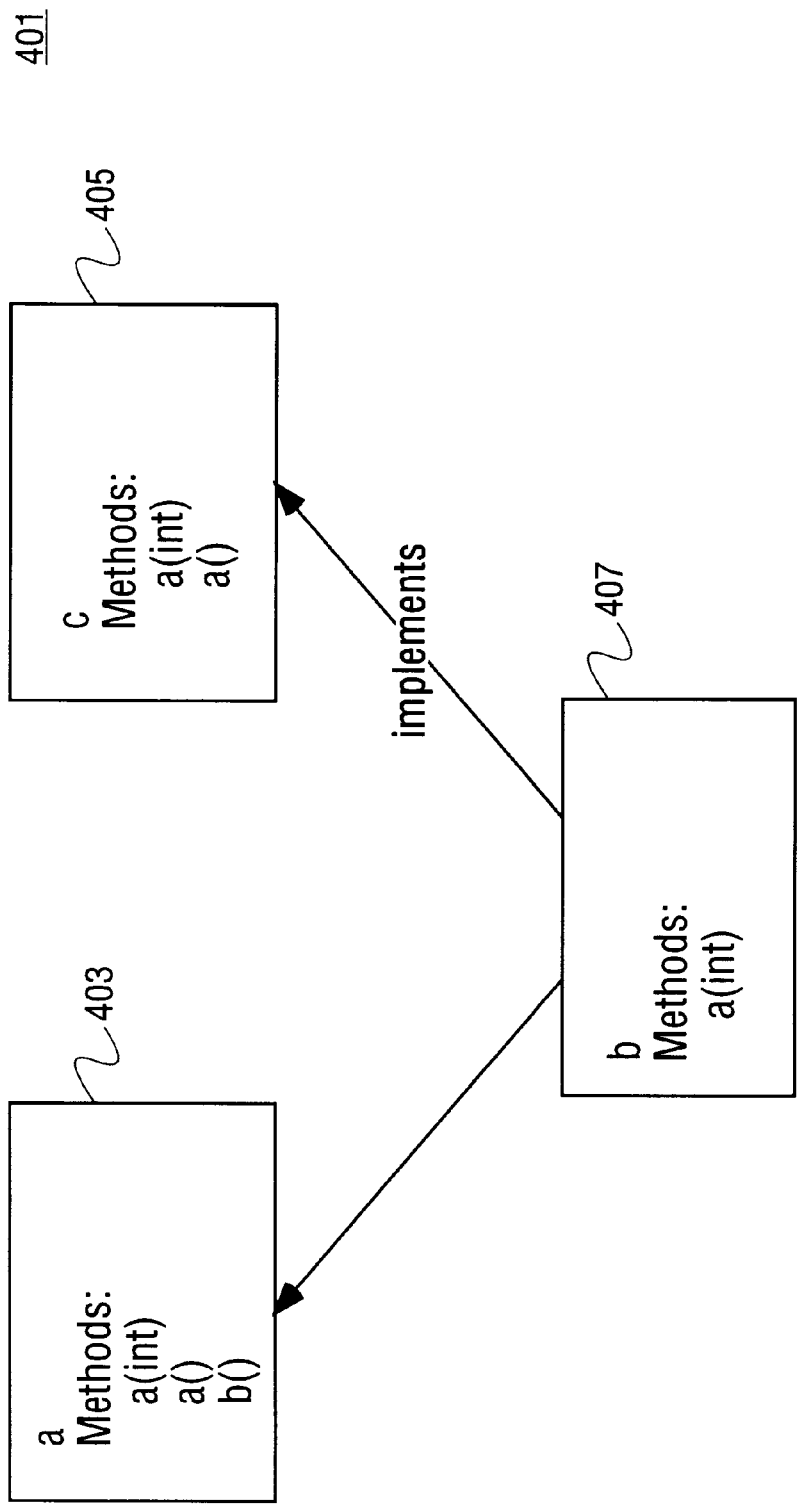
FIG. 4 is an illustration of one embodiment of a class inheritance hierarchy including an interface with renamed identifiers in accordance with the teachings of the present invention.

FIG. 4 is an illustration of the class inheritance hierarchy of FIG. 3 with renamed identifiers in accordance with the teachings of the present invention. As shown in FIG. 4, MyClass 303, MyInterface 305 and MySubclass 307 are renamed to "a" 403, "b" 405 and "c" 407, respectively. The methods getX(int), getY( ) and getZ( ) are renamed to "a(int)," "a( )" and "b( )," respectively.

In one embodiment of the present invention, the definition of interfaces discussed above is extended across elaborate inheritance and Java interfaces. Although interfaces are quite different then simple superclasses in the Java programming language, for the purposes of renaming in the present invention, interfaces are simply treated as another parent in one embodiment of the present invention.

Inheritance Rules

Java defines several access modifiers, which, among other things, specify the methods that are to be inherited and the methods that are not to be inherited. The Java access modifiers are:

```
private: never inherited
protected: always inherited
default: only inherited if classes are in the same package
public: always inherited
```

It is noted that there also exist "static" methods. For the purposes of the present invention, "static" methods act as private methods and are therefore never inherited.

Procedure for Renaming Methods

Figure 5:
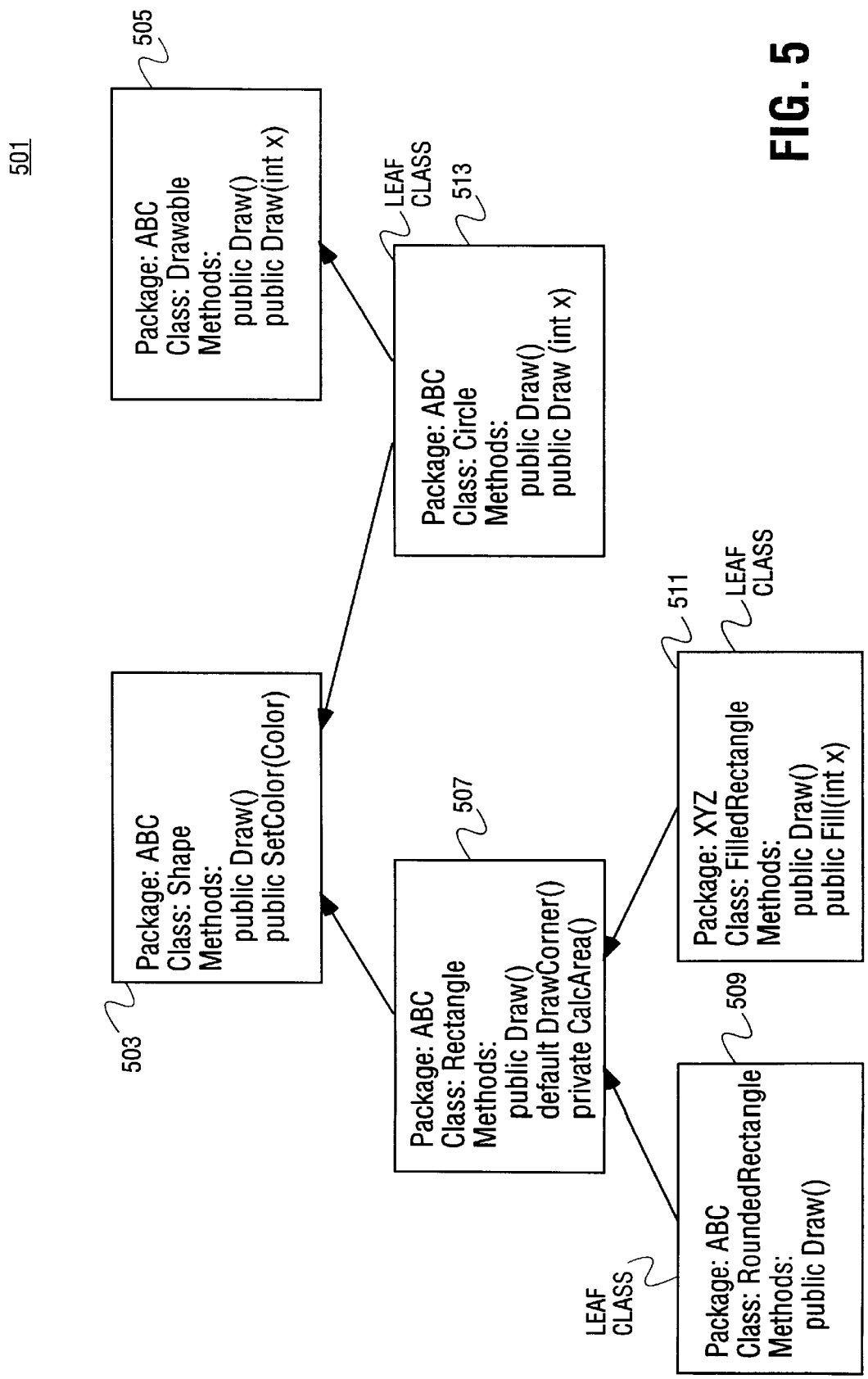
FIG. 5 is an illustration of another embodiment of a class inheritance hierarchy indicating leaf classes in accordance with the teachings of the present invention.

In one embodiment, the process of renaming methods begins with generating a class inheritance hierarchy tree or the like. FIGS. 1–5 illustrate sample hierarchy trees 101, 201, 301, 401 and 501, which identify naming dependencies among methods within Java class inheritance hierarchies. As shown in FIG. 5, "Shape" 503 is a superclass of "Rectangle" 507 and "Circle" 513. "Circle" 513 implements the interface "Drawable" 505. "Rectangle" 507 is a superclass of "RoundedRectangle" 509 and "FilledRectangle" 511. As also shown in FIG. 5, "FilledRectangle" 511 is of package "XYZ" while the remaining classes and interface of hierarchy tree 501 are of package "ABC."

Once the naming dependencies among the methods within the Java inheritance hierarchies can be determined, all leaf classes of the hierarchy trees are identified. Leaf classes are those classes of the hierarchy trees that have no subclasses. In hierarchy tree 101 of FIG. 1, the leaf classes are "Ostrich" 105, "Sparrow" 107 and "Hummingbird" 109. In hierarchy tree 501 of FIG. 5, the leaf classes are "RoundedRectangle" 509, "FilledRectangle" 511 and "Circle" 513.

In one embodiment, method lists are generated for each leaf class. The method lists include all methods that each class inherit as well as methods that are included within each class. In one embodiment, the construction of method lists involves an upward scan of the hierarchy tree. The access modifiers of each method are used in this determination. It is noted that overridden methods will have redundant entries into the list. FIG. 5 shows an example.

FIG. 6A shows method lists 601A, 603A and 605A, which correspond to are "RoundedRectangle" 509, "FilledRectangle" 511 and "Circle" 513, respectively. For example, method list 601A includes the inherited methods "Draw( )" and "SetColor(Color)" from "Shape" 503, the inherited methods "Draw( )" and "DrawCorner( )" of "Rectangle" 507 and the internal method "Draw( )" of "RoundedRectangle" 509 itself. Method list 603A includes the inherited methods "Draw( )" and "SetColor(Color)" from "Shape" 503, the inherited method "Draw( )" of "Rectangle" 507 and the internal methods "Draw( )" and "Fill(int) of "FilledRectangle" 511 itself. Method list 605A includes the inherited methods "Draw( )" and "SetColor(Color)" from "Shape" 503 and the internal methods "Draw( )" and "Draw(int) of "Circle" 513 itself.

Note that "CalcArea( )" of "Rectangle" 507 is not included in method list 601A since "CalcArea( )" has a "private " access modifier. "DrawCorner( )" is included in method list 601A, even though "DrawCorner( )" has an access modifier of "default" because both "RoundedRectangle" 509 and "Rectangle" 507 are of package "ABC." However, "DrawCorner( )" is not included in method list 603A at this time since "FilledRectangle" 511 is of package 511 and "Rectangle" 507 is of class "ABC."

Next, all incidences of superclasses that contain default methods are noted. If any of these superclasses are of different packages than any of its subclasses, then the default methods of the superclass are added to the method lists of the subclass. This aspect of the present invention is illustrated in FIG. 6B with reference to FIG. 5. In this example, note "Rectangle" 507 of package "ABC" and "Filled Rectangle" 511 of package "XYZ" . "Filled Rectangle" 511 does not inherit "DrawCorner( )" because of the different package names and the "default" access modifier of "DrawCorner( )."

However, in one embodiment, "DrawCorner( )" is added to method list 603B, as shown in FIG. 6B, in order to avoid collisions. In one embodiment, all such "default" methods are marked as to their status. In the off case that "FilledRectangle" 511 also included a "DrawCorner( )" method, the present invention is aware that the "DrawCorner( )" of "FilledRectangle" 511 is different from the "DrawCorner( )" of "Rectangle" 507. Thus, the are renamed with different names.

With the method lists and the naming dependencies identified with the class inheritance hierarchy trees, renaming can begin in accordance with the teachings of the present invention. In one embodiment, the original method names of the inherited methods of each method list are replaced with corresponding different method names. Similarly, the original method names of overridden methods of each method list are replaced with corresponding different method names.

Figure 7:
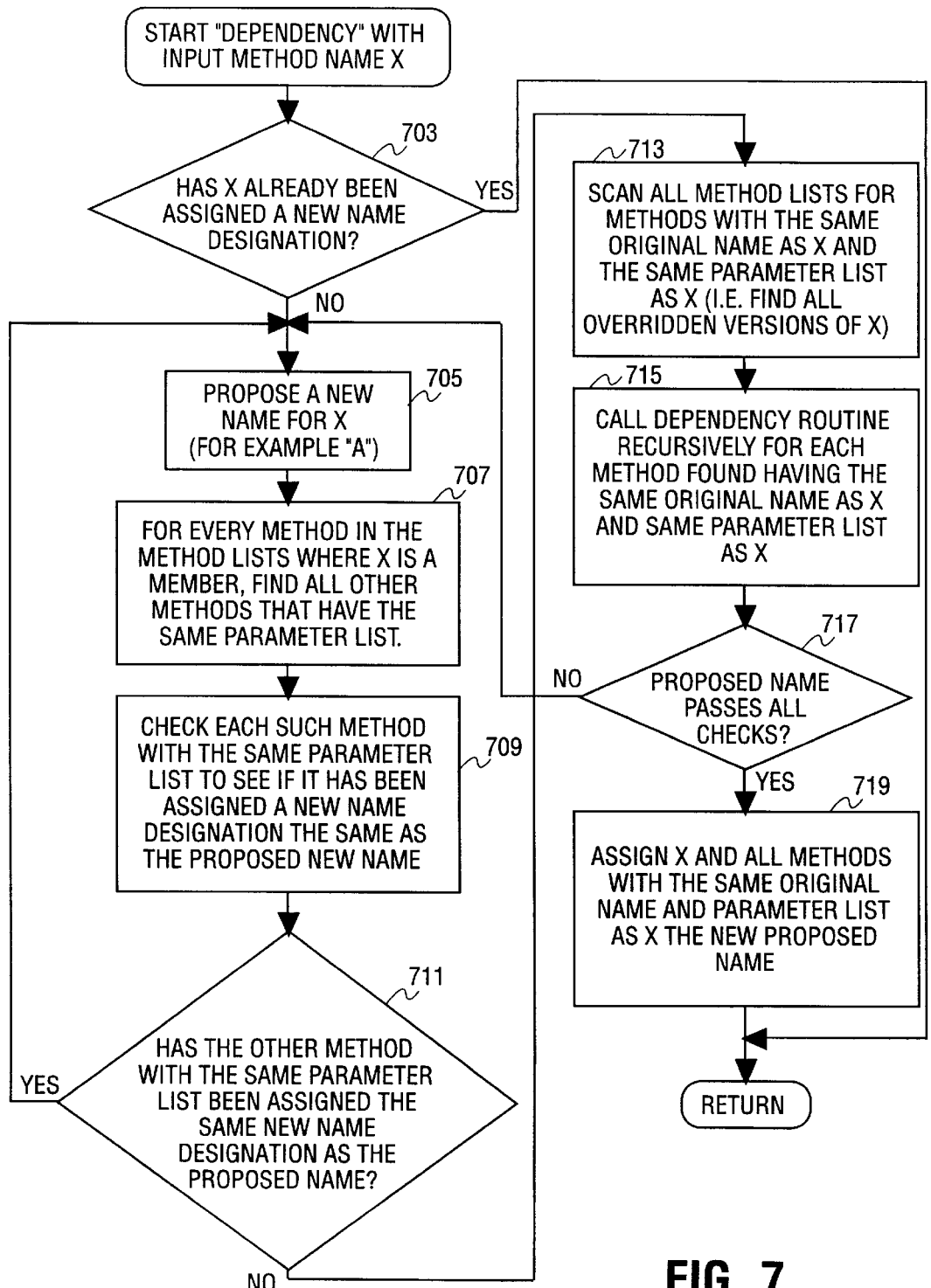
FIG. 7 is a flow diagram of one embodiment of a "Dependency" routine performed to rename methods in accordance with the teachings of the present invention.

In one embodiment, this aspect of the present invention is realized by performing a "Dependency" routine on the methods that are not "private" or "static" that are listed in the method lists. FIG. 7 is flow diagram 701 of one embodiment of a "Dependency" routine in accordance with the teachings of the present invention. As will be discussed, one embodiment of the "Dependency" routine allows new method names to be systematically proposed and assigned by starting at a given location in an ordered list of proposed new names and then traversing the ordered list. New names are not assigned until acceptable new names are identified in view of the naming dependencies of Java. Thus, each renamed identifier maintains its distinguishing characteristics, including name and parameter list.

After the inherited and overridden methods, all of which are not "private" or "static" and therefore have inheritance dependencies, are renamed, all classes including leaves are rescanned to identify any remaining non-renamed methods. The remaining non-renamed methods include the non-inherited methods, which include the "private" and "static" methods from the non-leaf classes as well as the "private," "static" and single-incidence methods in the leaf classes. In one embodiment, the "Dependency" routine is run with the remaining non-renamed methods to rename the remaining methods in accordance with the teachings of the present invention.

FIG. 6C shows method lists 601C, 603C and 605C after one iteration of running the "Dependency" routine illustrated in FIG. 7. In FIG. 6C, "Draw( )" of "Shape" 503 is renamed to "a( )," so the remaining "Draw( )" methods in method lists 601B, 603B and 605B are all renamed to "a( )." FIG. 6D shows the renaming in method lists 601D, 603D and 605D after the "SetColor(Color)" of "Shape" 503 is renamed. In FIG. 6D, all of the "SetColor(Color)" routines in method lists 601C, 603C, 605C are renamed to "a(Color)." Note that the renaming of both "Draw( )" and "SetColor(Color)" to "a" is acceptable since the two methods have different parameter lists.

FIG. 6E shows the renaming in method lists 601E, 603E and 605E after the "Draw(int)" of "Drawable" 505 is renamed. In FIG. 6E, all of the "Draw(int)" routines in method list 605D are renamed to "a(int)." Once again, note that the renaming of "Draw( )," "SetColor(Color)" and "Draw(int)" to "a" is acceptable since all three methods have different parameter lists.

FIG. 6F shows the renaming in method lists 601F, 603F and 605F after the "DrawCorner( )" of "Rectangle" 507 is renamed. In FIG. 6E, all of the "DrawCorner( )" routines in method lists 603E and 605E are renamed to "b( )." In this example, the "DrawCorner( )" routines were renamed to "b" instead of "a" since "Draw( )" of "Rectangle" 507 had already been renamed to "a." Since "DrawCorner( )" and "Draw( )" both have the same parameter lists, both methods could not be renamed with the same name "a."

FIG. 6G shows the renaming in method lists 601G, 603G and 605G after the "Fill(int)" of "FilledRectangle" 511 is renamed. In FIG. 6E, the "Fill(int)" routine in method list 605F are renamed to "b(int)." In this example, the "Fill(int)" routine was renamed to "b" instead of "a" since "Draw(int)" of "Circle" 513 had already been renamed to "a." Since "Fill(int)" and "Draw(int)" both have the same parameter lists, both methods could not be renamed with the same name "a."

Dependency Subroutine

FIG. 7 is a flow diagram 701 of one embodiment of a "Dependency" routine in accordance with the teachings of the present invention. As discussed earlier, the "Dependency" routine is performed in one embodiment when renaming methods. In one embodiment, "Dependency" is called with an input parameter X being the method name of the method to be renamed. As shown in decision step 703, if X already has an assigned new name, then return. That its, there is no need to reprocess X if it has already been renamed.

Next, processing step 705 shows that a new name is proposed. In one embodiment, the new names that are proposed are according to an ordered list of names. The actual names in list of names can be arbitrary as long as each name is unique. Examples of ordered lists can be "a, b, c, . . . etc." or "0, 1, 2, . . . etc." or "red, orange, yellow, . . . etc." or the like. In one embodiment, new names that are proposed always begin from the same predetermined starting location and traverse the ordered list sequentially. For example, assume that the first new name to be proposed is "a." If is "a" is taken, then "b" is proposed. New names are proposed until an acceptable new name is identified.

It is noted that by starting at the same location in the ordered list (e.g. the beginning) when proposing new names, a plurality of methods may ultimately be renamed to the same new name. Thus, naming redundancy will be introduced. Furthermore, it is noted that because new names are proposed from the same starting point in the ordered list, an "optimal" or improved renaming will result since a minimum number of new different names will ultimately be used. Although many of the methods may end up with the same name (e.g. "a") even though their original names were different (e.g. "Circle(int)" and "Square ( )"), the renamed methods would still be distinguishable since the methods will have different parameter lists.

In another embodiment, the new names that are proposed in processing step 705 do not always start at the predetermined location in the ordered list. Instead, non-redundant unique names are always proposed. As a result, redundantly named methods will be assigned new unique names. As mentioned earlier, a benefit of this embodiment would be to de-obfuscate the output of another embodiment of the present invention.

Processing step 707 shows all method lists are then scanned where X is a member. All other methods that have the same parameter list as X are then identified. Processing step 709 shows that each such method that is found is checked to see if the found method has an assigned new name designation the same as the proposed name. Thus, if the proposed new name is "a," this portion of the routine identifies whether another other method with this parameter list has already claimed "a." Decision step 711 shows that if the proposed name has already been assigned, processing goes back to step 705 where another name is proposed.

Assuming that the proposed name has already been assigned, processing step 713 shows that all methods lists are then scanned for methods with same original name as X and the same parameter list as X. In other words, all overridden versions of X are then identified. Processing step 715 shows that the "Dependency" routine is called again recursively at this point for each method having the same original name as X and the same parameter list as X. It is noted that the recursive call of "Dependency" is designed in one embodiment never to rescan the same method list twice.

Decision step 717 and processing step 719 show that if the proposed name passes all checks, X and all methods with same original name and parameter list are assigned the new proposed name.

Computer System

Figure 8:
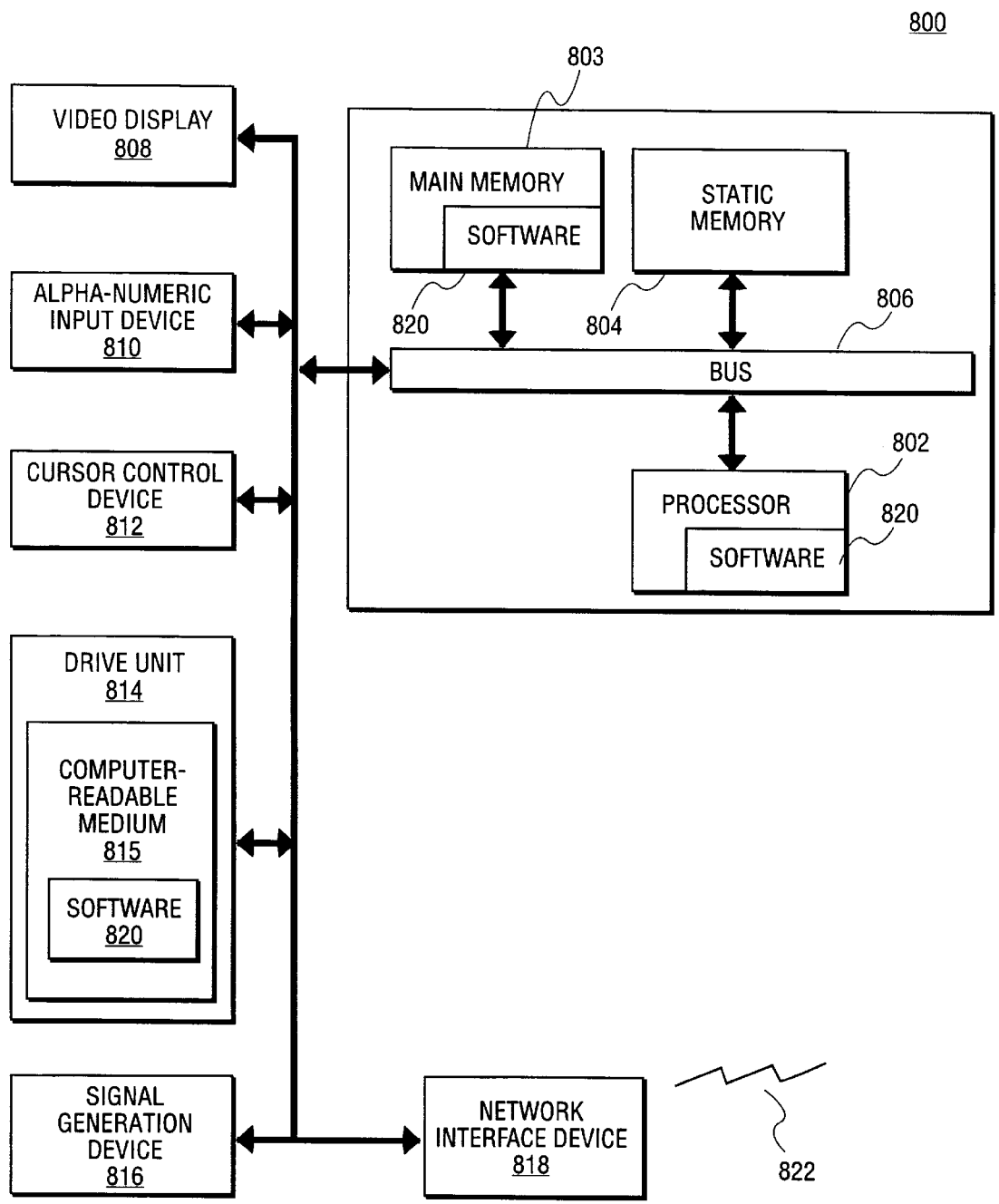
FIG. 8 is a diagram of one embodiment of a computer system on which the methodologies of the present invention may be performed.

FIG. 8 shows a diagrammatic representation of one embodiment of a computer system 800 within which software for performing the methodologies discussed above may operate. The computer system 800 includes a processor 802, a main memory 803, which communicate via a bus 806. The computer system 800 is further shown to include a video display unit 808 (e.g., a liquid crystal display or a cathode ray tube (CRT) or the like). The computer system 800 also includes an alpha-numeric input device 810 (e.g. a keyboard), a cursor control device 812 (e.g. a mouse or a trackball or the like), a disk drive unit 814, a signal generation device 816 (e.g. speaker) and a network interface device 818. The disk drive unit 814 includes a computer-readable medium 815 on which software 820 is also shown to reside, completely or at least partially, within the main memory 803 and/or within the processor 802. The software 820 may further be transmitted or received via the network interface device 818. For the purposes of this specification, the term "computer-readable medium" shall be taken to include any medium which is capable of storing or encoding a sequence of instructions for execution by a processor and that cause the processor to perform the methodologies of the present invention. The term "computer-readable medium" shall be taken to include, but not be limited to, solid-state memories, optical and magnetic disks and carrier wave signals 822, which in one embodiment may be received through network interface device 818.

In the foregoing detailed description, the method and apparatus of the present invention has been described with reference to specific exemplary embodiments thereof. However, it will be evident that various modifications and changes may be made thereto without departing from the broader spirit and scope of the present invention. The present specification and figures are accordingly to be regarded as illustrative rather than restrictive.

What is claimed is:

1. A method of renaming identifiers of a computer program independent of compiling or executing the computer program, the method comprising:

generating a class inheritance hierarchy of the computer program such that naming dependencies among methods of the computer program are identified;

generating method lists for each leaf class of the class inheritance hierarchy, wherein each method list includes non-inherited methods of the leaf class and inherited methods of the leaf class;

adding default methods of superclasses having different package names to the method lists of each leaf class;

replacing consistently original method names of the inherited methods of each method list with corresponding different method names;

replacing consistently original method names of overridden methods of the each method list with corresponding different method names; and replacing original method names of remaining non-renamed methods of each class of the computer program with corresponding different method names.

2. The method described in claim 1 including renaming classes of the computer program with corresponding different class names, wherein the renaming the classes comprises:

identifying original class names of the classes of the computer program; and replacing the original class names with the corresponding different class names.

3. The method described in claim 2 wherein the replacing the original class names with the corresponding different class names includes sequentially replacing the original class names according to an ordered list of unique names, wherein the class field names are replaced with the corresponding different class names that maintain distinguishing characteristics of the classes of the computer program.

4. The method described in claim 1 including renaming fields of the computer program with corresponding different field names, wherein the renaming the fields of the computer program comprises:

identifying the classes of the computer program;

identifying original field names of fields within each class identified in the identifying the classes of the computer program; and replacing the original field names within each class with the corresponding different field names.

5. The method described in claim 4 wherein the replacing the original field names within each class with the corresponding different field names includes sequentially replacing the original field names within each class according to an ordered list of unique names.

6. The method described in claim 5 wherein the sequentially replacing the original field names within each class includes starting at a predetermined location in the ordered list of unique names for each class of the computer program, wherein the original field names are replaced with the corresponding different field names that maintain distinguishing characteristics of the fields of the computer program, wherein a plurality of fields of the computer program having different original field names are replaced with redundant corresponding different field names.

7. The method described in claim 4 including disregarding local variable names of the computer program.

8. The method described in claim 4 wherein the replacing the original field names within each class with the corresponding different field names includes the step of replacing redundant original field names with unique names.

9. The method described in claim 1 wherein the replacing consistently the original method names of inherited methods, replacing consistently the original method names of overridden methods and replacing original method names of remaining non-renamed methods include sequentially replacing the original method names according to an ordered list of unique names.

10. The method described in claim 9 wherein the sequentially replacing the original method names includes starting at a predetermined location in the ordered list of unique names, wherein original method names are replaced with the corresponding different method names that maintain distinguishing characteristics with parameter lists of the methods of the computer program, wherein a plurality of methods of the computer program having different original method names are replaced with redundant corresponding different method names.

11. The method described in claim 1 wherein the corresponding different method names are smaller than original class names of the computer program.

12. The method described in claim 1 wherein the corresponding different method names are larger than original class names of the computer program.

13. The method described in claim 1 wherein the corresponding different method names are non-descriptive.

14. The method described in claim 1 wherein the replacing consistently the original method names of inherited methods, replacing consistently the original method names of overridden methods and replacing original method names of remaining non-renamed methods include replacing redundant original method names with unique names.

15. A method of reducing a storage size of a program code sequence independent of compiling or executing the program code sequence, the method comprising:

replacing original class names of classes of the program code sequence with corresponding smaller class names;

replacing original field names of fields of the program code sequence with corresponding different field names;

generating a class inheritance hierarchy of the program code sequence such that naming dependencies among methods of the program code are identified;

replacing consistently original method names of inherited methods with corresponding different method names in accordance with naming dependencies determined by the class inheritance hierarchy;

replacing consistently original method names of overridden methods with corresponding different method names in accordance with the naming dependencies determined by the class inheritance hierarchy; and replacing original method names of remaining non-renamed methods of each class of the program code sequence with corresponding different method names in accordance with the naming dependencies determined by the class inheritance hierarchy.

16. The method described in claim 15 wherein the replacing the original class names includes:

disregarding package organization aspects of the original class names; and sequentially replacing the original class names with the corresponding smaller class names according to an ordered list of unique smaller names.

17. The method described in claim 15 wherein the replacing the original field names includes:

sequentially replacing the original field names of each class of the program code sequence with the corresponding smaller field names according to an ordered list of unique smaller names; and starting at a predetermined location in the ordered list of unique smaller names for each class.

18. The method described in claim 15 wherein the replacing consistently the original method names of the inherited methods, of the non-inherited methods and the remaining non-renamed methods comprise:

sequentially replacing the original method names of the program code sequence with the corresponding smaller method names according to an ordered list of unique smaller names; and starting at a predetermined location in the ordered list of unique smaller names for each class such that original method names are replaced with the corresponding smaller method names that maintain distinguishing characteristics with parameter lists of each of the methods of the program code sequence.

19. An article of manufacture including one or more computer-readable media having sequences of instructions stored thereon, which when executed by a processor, cause the processor to reduce a storage size of a program code sequence independently of compiling or executing the program code sequence by:

replacing original class names of classes of the program code sequence with corresponding smaller class names;

replacing original field names of fields of the program code sequence with corresponding different field names;

generating a class inheritance hierarchy of the program code sequence such that naming dependencies among methods of the program code are identified;

replacing consistently original method names of inherited methods with corresponding different method names in accordance with naming dependencies determined by the class inheritance hierarchy;

replacing consistently original method names of overridden methods with corresponding different method names in accordance with the naming dependencies determined by the class inheritance hierarchy; and replacing original method names of remaining non-renamed methods of each class of the program code sequence with corresponding different method names in accordance with the naming dependencies determined by the class inheritance hierarchy.

20. The article described in claim 19 wherein the replacing the original class names includes:

disregarding package organization aspects of the original class names; and sequentially replacing the original class names with the corresponding smaller class names according to an ordered list of unique smaller names.

21. The article described in claim 19 wherein the replacing the original field names includes:

sequentially replacing the original field names of each class of the program code sequence with the corresponding smaller field names according to an ordered list of unique smaller names; and starting at a predetermined location in the ordered list of unique smaller names for each class.

22. The article described in claim 19 wherein the replacing consistently original method names of inherited methods, of non-inherited methods and remaining non-renamed methods comprise:

sequentially replacing the original method names of the program code sequence with the corresponding smaller method names according to an ordered list of unique smaller names; and starting at a predetermined location in the ordered list of unique smaller names for each class such that original method names are replaced with the corresponding smaller method names that maintain distinguishing characteristics with parameter lists of each of the methods of the program code sequence.

23. The article described in claim 19 wherein the program code sequence is included in a Java program code sequence.

24. The article described in claim 19 wherein the ordered list of unique smaller names includes non-descriptive names.

25. The article described in claim 19 wherein the original method names of overridden methods are replaced consistently with the same corresponding different names and the original method names of methods having same original method names and same parameter lists are replaced consistently with the same corresponding different names.

26. An article of manufacture including one or more computer-readable media having sequences of instructions stored thereon, which when executed by a processor, cause the processor to obfuscate a program code sequence independently of compiling or executing the program code sequence by:

replacing original class names of classes of the program code sequence with corresponding non-descriptive class names;

replacing original field names of fields of the program code sequence with corresponding non-descriptive field names;

generating a class inheritance hierarchy of the program code sequence such that naming dependencies among methods of the program code are identified;

replacing consistently original method names of inherited methods with corresponding non-descriptive method names in accordance with naming dependencies determined by the class inheritance hierarchy;

replacing consistently original method names of overridden methods with corresponding non-descriptive method names in accordance with the naming dependencies determined by the class inheritance hierarchy; and replacing original method names of remaining non-renamed methods of each class of the program code sequence with corresponding non-descriptive method names in accordance with the naming dependencies determined by the class inheritance hierarchy.

27. The article described in claim 26 wherein the replacing the original class names includes:

disregarding package organization aspects of the original class names; and sequentially replacing the original class names with the corresponding non-descriptive class names according to an ordered list of unique non-descriptive names.

28. The article described in claim 26 wherein the replacing the original field names includes:

sequentially replacing the original field names of each class of the program code sequence with the corresponding non-descriptive field names according to an ordered list of unique non-descriptive names; and starting at a predetermined location in the ordered list of unique non-descriptive names for each class.

29. The article described in claim 26 wherein the replacing consistently original method names of inherited methods, of non-inherited methods and remaining non-renamed methods comprise:

sequentially replacing the original method names of the program code sequence with the corresponding non-descriptive method names according to an ordered list of unique non-descriptive names; and starting at a predetermined location in the ordered list of unique non-descriptive names for each class such that original method names are replaced with the corresponding non-descriptive method names that maintain distinguishing characteristics with parameter lists of each of the methods of the program code sequence.

30. The article described in claim 26 wherein the program code sequence is included in a Java program code sequence.

31. The article described in claim 26 wherein the ordered list of unique non-descriptive names includes smaller names.

32. A computer data signal embodied in a carrier wave and representing sequences of instructions, which when executed by a processor, cause the processor to perform independent of compiling or executing a computer program:

replacing original class names of classes of the computer program with corresponding different class names;

replacing original field names of fields of the computer program with corresponding different field names;

generating a class inheritance hierarchy of the computer program such that naming dependencies among methods of the computer program are identified;

replacing consistently original method names of inherited methods with corresponding non-descriptive method names in accordance with naming dependencies determined by the class inheritance hierarchy;

replacing consistently original method names of overridden methods with corresponding non-descriptive method names in accordance with the naming dependencies determined by the class inheritance hierarchy; and replacing original method names of remaining non-renamed methods of each class of the program code sequence with corresponding non-descriptive method names in accordance with the naming dependencies determined by the class inheritance hierarchy.

33. The computer data signal of claim 32 wherein the replacing the original class names includes:

disregarding package organization aspects of the original class names; and sequentially replacing the original class names with the corresponding different names according to an ordered list of unique different names.

34. The computer data signal of claim 32 wherein the replacing the original field names includes:

sequentially replacing the original field names of each class of the computer program with the corresponding different field names according to an ordered list of unique different names; and starting at a predetermined location in the ordered list of unique different names for each class.

35. The computer data signal of claim 32 replacing consistently original method names of inherited methods, of non-inherited methods and remaining non-renamed methods comprise:

sequentially replacing the original method names of the computer program with the corresponding smaller method names according to an ordered list of unique smaller names; and starting at a predetermined location in the ordered list of unique smaller names for each class such that original method names are replaced with the corresponding smaller method names that maintain distinguishing characteristics with parameter lists of each of the methods of the computer program.

* * * * *